No. 21,078. PATENTED AUG. 3, 1858.
E. MANLEY.
PRESERVE CAN.
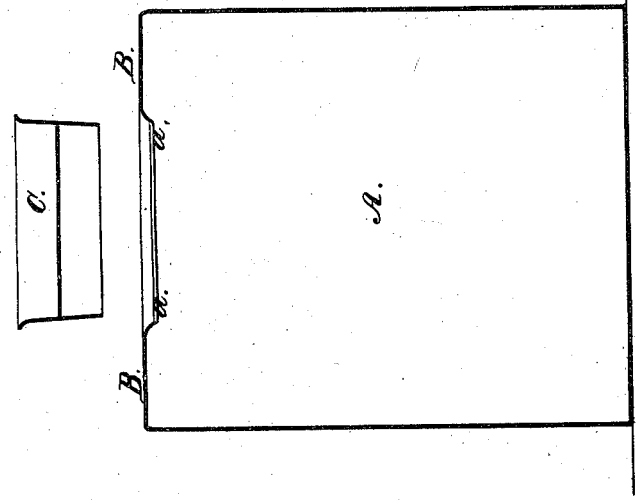
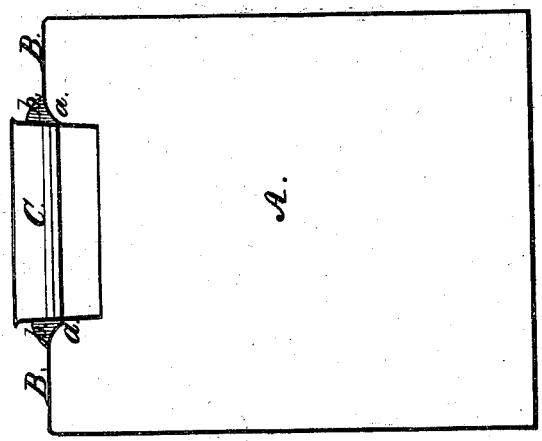

UNITED STATES PATENT OFFICE.

E. MANLEY, OF MARION, NEW YORK.

IMPROVEMENT IN PRESERVE-CANS.

Specification forming part of Letters Patent No. 21,078, dated August 3, 1858.

*To all whom it may concern:*

Be it known that I, EMMONS MANLEY, of Marion, in the county of Wayne and State of New York, have invented a new and useful Improvement in Preserve-Cans; and I do hereby declare that the following is a full, clear, and exact description of the same, reference being had to the accompanying drawings, making part of this specification, in which—

Figure 1 is a central section of a can constructed according to my invention, exhibiting it sealed. Fig. 2 is a similar view, exhibiting the can with its stopper removed.

Similar letters of reference indicate corresponding parts in both of the figures.

This invention consists in forming a depression round the edge of the mouth of the can and fitting the mouth with a stopper of the form of a cup, whose exterior combines with the depression round the mouth to form a channel to receive the sealing composition or cement, and whose interior serves to receive cold water, to cool and cause the setting of the cement after the closing and sealing of the can, and to receive hot water to melt or soften the cement for the purpose of enabling the stopper to be removed when it is desired to open the can.

To enable others to make and use my invention, I will proceed to describe its construction and operation.

A is the body of the can, and B is the head, in which the mouth $a\,a$ is formed by cutting a circular opening without forming a neck. The depression of the edge of the mouth is exhibited in both figures.

C is the stopper, made of tin plate in the form of a cup, which is slightly tapered to permit its being inserted tightly into the mouth $a\,a$. The channel formed by the combination of this cup-shaped stopper is indicated by $b\,b$ in Fig. 1, where the cement with which the said cavity is filled, to seal the joint around the stopper, is shown in red color.

When the can is filled and the air expelled in the usual manner, the stopper is inserted and pushed in tightly, and the cement or sealing composition in a melted state is poured into the channel $b\,b$, after which the cup of the stopper C is filled with cold water, which causes the cement to set before any of it has time to find its way through the joint, and to fasten the stopper in place. When it is desired to open the can, the cup is filled with boiling water, which softens the cement or sealing composition and permits the stopper to be pulled out without any difficulty.

The sealing cement or composition I usually employ is composed of beeswax and rosin in the proportions generally used for the same purpose; but any cement or composition which melts or is sufficiently softened at the temperature of boiling water may be used.

This preserve-can possesses advantages over most others in the cheapness of its construction and the facility with which it can be opened without injury. It may be used season after season.

I do not claim, broadly, the formation of a wax-space between the lip and the stopper; but

What I claim as my invention, and desire to secure by Letters Patent, is—

The combination of the depression around the mouth of the can and the cup-formed stopper, constructed and operating substantially as herein described.

EMMONS MANLEY.

Witnesses:
   J. PEDDIE,
   B. S. BUSH.